(12) United States Patent
Hahn et al.

(10) Patent No.: US 12,360,687 B2
(45) Date of Patent: Jul. 15, 2025

(54) OPTIMIZED POWER UP IN STORAGE MEMORY DEVICES

(71) Applicant: Western Digital Technologies, Inc., San Jose, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 20 days.

(21) Appl. No.: 18/357,762

(22) Filed: Jul. 24, 2023

(65) Prior Publication Data

US 2025/0036293 A1    Jan. 30, 2025

Related U.S. Application Data

(60) Provisional application No. 63/498,506, filed on Apr. 26, 2023.

(51) Int. Cl.
*G06F 3/06* (2006.01)
*G06F 1/3234* (2019.01)

(52) U.S. Cl.
CPC .......... *G06F 3/0625* (2013.01); *G06F 1/3268* (2013.01); *G06F 3/0653* (2013.01); *G06F 3/0679* (2013.01)

(58) Field of Classification Search
CPC .... G06F 3/0625; G06F 1/3268; G06F 3/0653; G06F 3/0679
See application file for complete search history.

(56) References Cited

U.S. PATENT DOCUMENTS

| 7,861,098 B2 | 12/2010 | Theocharous et al. |
| 8,370,720 B2 | 2/2013 | Allen |
| 9,207,869 B2 | 12/2015 | Salomon et al. |
| 2013/0262888 A1 | 10/2013 | Scott et al. |
| 2016/0321183 A1 | 11/2016 | Govindan et al. |

(Continued)

FOREIGN PATENT DOCUMENTS

KR    20170042985 A    4/2017

OTHER PUBLICATIONS

"Instant Go." Wikipedia, The Free Encyclopedia, Jun. 19, 2022, https://en.wikipedia.org/w/index.php? title=InstantGo&oldid=1093833535.

(Continued)

*Primary Examiner* — Sean D Rossiter
(74) *Attorney, Agent, or Firm* — Patterson + Sheridan, LLP

(57) ABSTRACT

Rather than using low power mode since there is no indication of a sleep mode type to the data storage device, the sleep mode type is inferred by the data storage device, or supplied by the host. In so doing, the sleep type communication is improved. After the system returns power to the data storage device, there may be a read workload, depending on the sleep type. The workload is characterized by a low-queue depth (QD) sequential read from a specific area of the storage medium that was written to just prior to shut down. In response to inference or host cue, the data storage device will modify an operation so that data storage device is optimized to the sleep mode type, resulting in improved performance and power consumption.

20 Claims, 5 Drawing Sheets

(56) References Cited

U.S. PATENT DOCUMENTS

| | | |
|---|---|---|
| 2018/0307297 A1 | 10/2018 | Semeria et al. |
| 2021/0026437 A1 | 1/2021 | Lingutla et al. |
| 2022/0229566 A1* | 7/2022 | Benisty ................. G06F 3/0653 |
| 2022/0317757 A1 | 10/2022 | Rao et al. |
| 2022/0398024 A1 | 12/2022 | Ge |
| 2023/0041215 A1* | 2/2023 | Porzio ................... G06F 3/0625 |
| 2023/0229218 A1* | 7/2023 | Choi ....................... G06F 1/266 |
| | | 713/310 |
| 2024/0298225 A1* | 9/2024 | Hyde ................. H04W 36/0083 |
| 2024/0370357 A1* | 11/2024 | Aurongzeb ......... G06F 11/3688 |

OTHER PUBLICATIONS

"Instant Go." Wikipedia, The Free Encyclopedia, Jul. 28, 2024, https://en.wikipedia.org/wiki/InstantGo.

* cited by examiner

OPTIMIZED POWER UP IN STORAGE MEMORY DEVICES

CROSS-REFERENCE TO RELATED APPLICATIONS

This application claims benefit of U.S. provisional patent application Ser. No. 63/498,506, filed Apr. 26, 2023, which is herein incorporated by reference.

BACKGROUND OF THE DISCLOSURE

Field of the Disclosure

Embodiments of the present disclosure generally relate to improved sleep type communication with the data storage device.

Description of the Related Art

Solid state drives/devices (SSDs) typically enter low power state (sleep power state) based on host idle time or a host directive. The host power policy is designed to reduce SSD power by either using non-volatile memory express (NVMe) power management controls or by using peripheral component interconnect express (PCIe) device power management features such as link and device power management (link states such as L1, L1.2, and L2/L3, and device states such as $D3_{hot}$ and $D3_{cold}$). Modern Standby is a hardware and software focused on equipping PC platforms with smartphone type of power management capabilities.

Modern Standby is a Microsoft Windows feature that keeps the host system and attached peripherals in a low power state when the system is not in active use. Typically, Modern Standby will be triggered when the host system is on battery power and/or does not have user interaction. For example, a laptop may go into Modern Standby when the lid is closed. During Modern Standby, attached peripherals (including the SSD) are generally kept in low power mode, but may be activated periodically.

Hibernate mode is triggered on low battery power, based on user input, or when the host system does not transition to Modern Standby. Hibernate mode writes the contents of host dynamic random access memory (DRAM) to the data storage device and then completely powers off the entire host, including attached peripherals such as the SSD. The type of sleep mode (Modern Standby or Hibernate mode) is not communicated to the data storage device. However, the information regarding the sleep type can be substantial to the performance of the data storage device.

Therefore, there is a need in the art for improved sleep type communication with the data storage device for optimized timing of different operations.

SUMMARY OF THE DISCLOSURE

Rather than using low power mode since there is no indication of a sleep mode type to the data storage device, the sleep mode type is inferred by the data storage device, or supplied by the host. In so doing, the sleep type communication is improved. After the system returns power to the data storage device, there may be a read workload, depending on the sleep type. The workload is characterized by a low-queue depth (QD) sequential read from a specific area of the storage medium that was written to just prior to shut down. In response to inference or host cue, the data storage device will modify an operation so that data storage device is optimized to the sleep mode type, resulting in improved performance and power consumption.

In one embodiment, a data storage device comprises: a memory device; and a controller coupled to the memory device, wherein the controller is configured to: receive an indication to enter sleep mode from a host device; predict a classification of sleep mode; conduct operations based upon scheduling prior to entering sleep mode; enter sleep mode; exit sleep mode; and conduct operations based upon scheduling after exiting sleep mode.

In another embodiment, a data storage device comprises: a memory device; and a controller coupled to the memory device, wherein the controller includes a sleep mode analysis module and wherein the controller is configured to: collect data of data storage device operations corresponding to different sleep modes; and predict a sleep mode based upon a received indication to enter sleep mode and the collected data.

In another embodiment, a data storage device comprises: means to store data; and a controller coupled to the means to store data, wherein the controller is configured to: receive indications to enter sleep mode from a host device; predict which sleep mode to enter based upon collected data or data storage device operations; and adjust predictive metrics based upon the collected data over time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than using low power mode since there is no indication of a sleep mode type to the data storage device, the sleep mode type is inferred by the data storage device, or supplied by the host. In so doing, the sleep type communication is improved. After the system returns power to the data storage device, there may be a read workload, depending on the sleep type. The workload is characterized by a low-queue depth (QD) sequential read from a specific area of the storage medium that was written to just prior to shut down. In response to inference or host cue, the data storage device will modify an operation so that data storage device is optimized to the sleep mode type, resulting in improved performance and power consumption.

Figure 1:
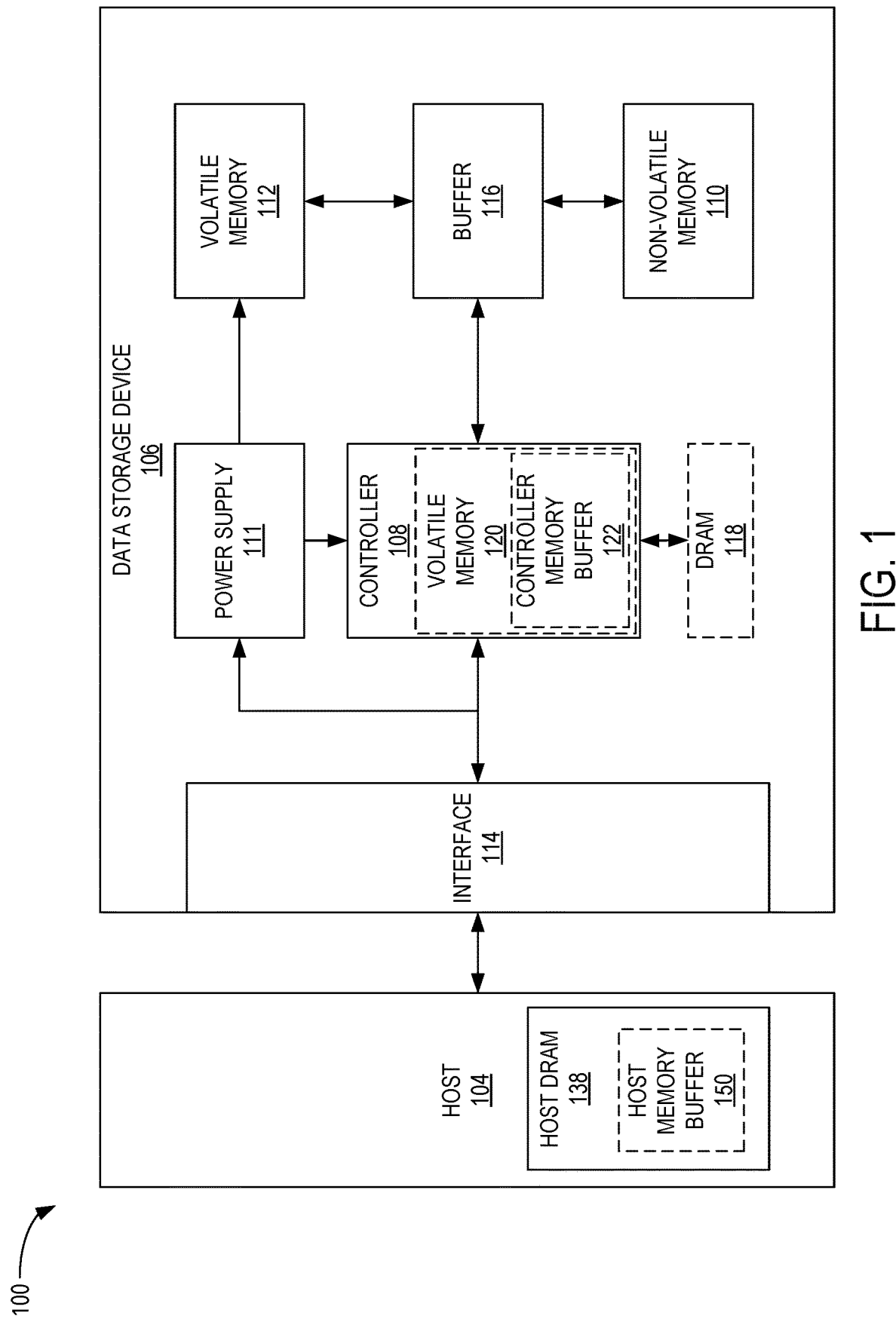
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)) though it is to be noted that when utilizing SATA CMB and/or HMB will not be supported, Fibre Channel Protocol (FCP), small computer system interface (SCSI), serially attached SCSI (SAS), PCI, and PCIe, non-volatile memory express (NVMe), Open-CAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As discussed herein, the sleep mode type is inferred by the data storage device (or NVM) or is supplied by the host. In response to the inference or host cue, the data storage device will modify operation so that the data storage device is optimized to the sleep mode type, resulting in improved performance and power consumption. After a host returns power to the data storage device, there may be a read workload, depending on the sleep type. For example, after hibernation is terminated, the state of the data storage device is read from the NVM. The workload is characterized by a low-QD sequential read from a specific area of the media, the same one that was written just prior to the shut down.

Figure 2:
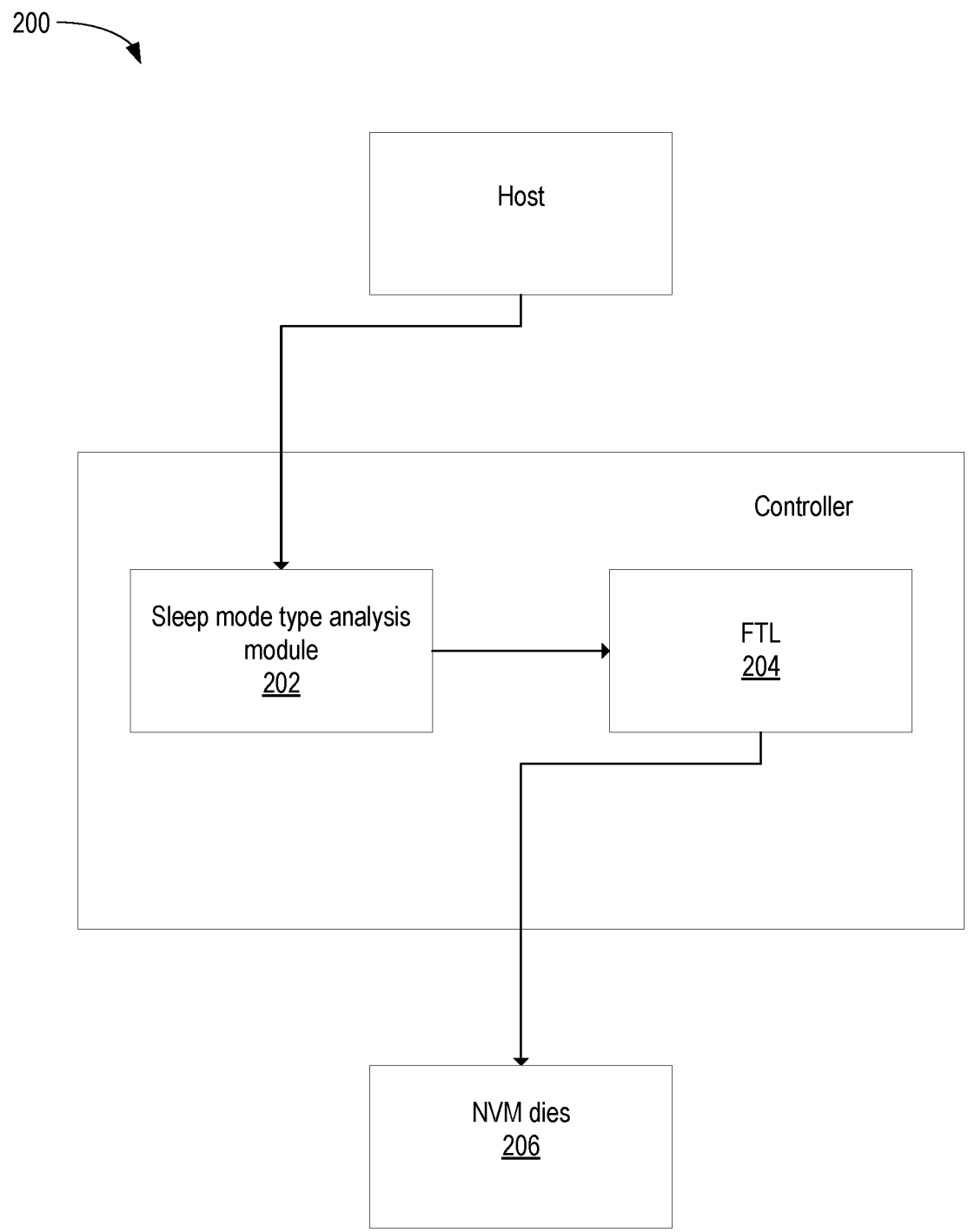
FIG. 2 is a schematic block diagram illustrating a storage system in which a controller comprises sleep mode module, according to certain embodiments.

FIG. 2 is a schematic block diagram illustrating a storage system 200 in which a controller comprises sleep mode module, according to certain embodiments. The power and allowed read latency that will be available for the storage system 200 will differ between Hibernation mode wake (abundant) opposed to Modern Standby wake (scarce). Planning system operations with the difference in mind may impact the considerations.

The storage system 200 comprise a host such as the host 104 of FIG. 1, a controller such as the controller 108 of FIG. 1, and NVM dies 206. The controller comprises a sleep module type analysis module 202 and a flash transition layer (FTL) 204. The module 202 may be hardware (HW) or firmware (FW). The module 202 is able to determine the type of sleep type that a device is in once in a sleep mode. The module 202 is able to use a few indicators to derive the sleep type. These indications may include, but are not limited to: the workflow of the host, past behavior of the host, logical block address (LBA) range accessed by the host (potentially identifying system power down procedures), and the time of an operation (e.g., may be turned off at night).

Figure 3:
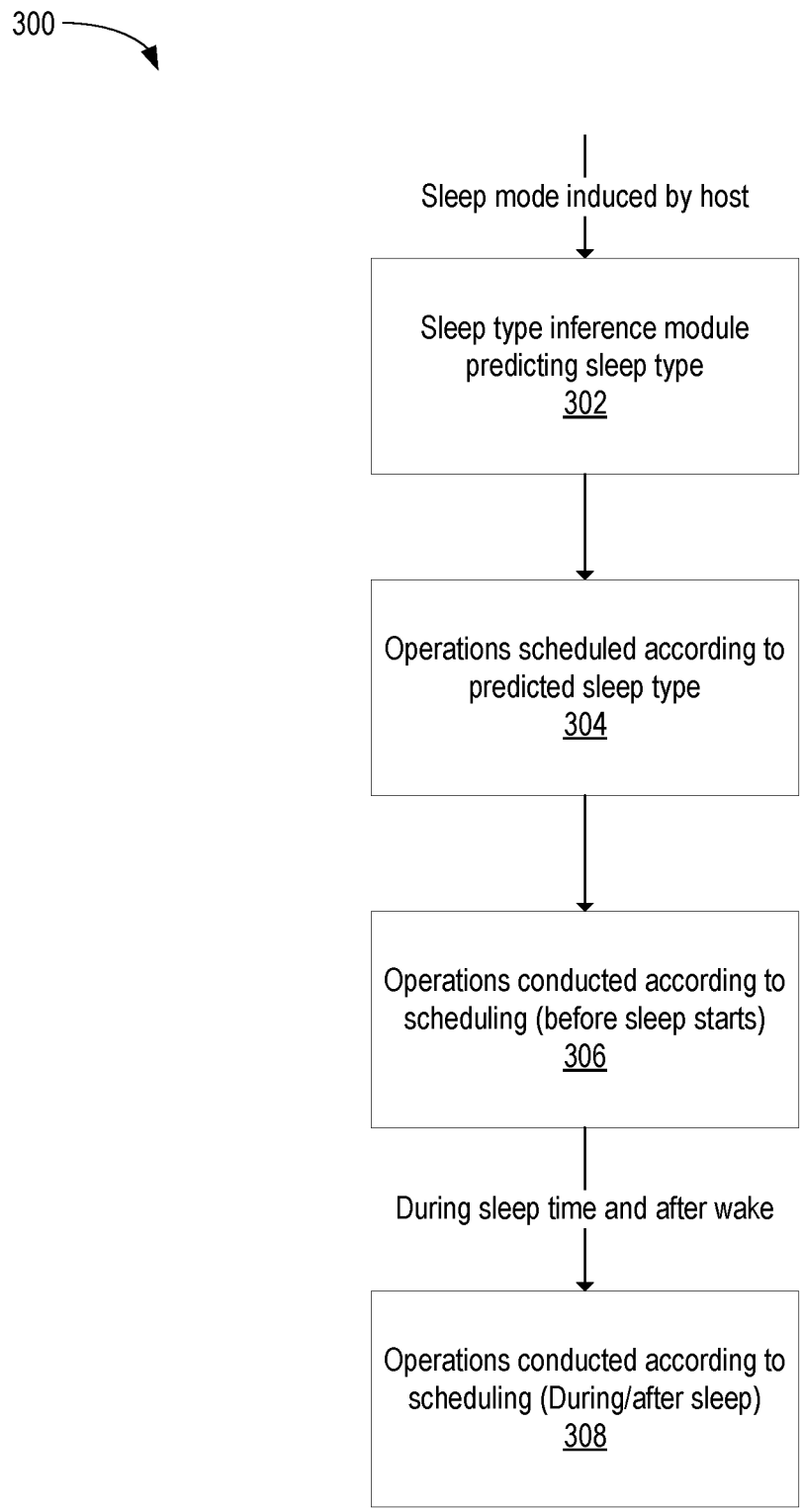
FIG. 3 is a flow chart illustrating a method for sleep type indication, according to certain embodiments.

FIG. 3 is a flow chart illustrating a method 300 for predicting sleep type, according to certain embodiments. The method 300 begins with sleep mode induced by the host such as host 104 of FIG. 1 and proceeds to block 302. At block 302, the sleep type inference module 202 predicts sleep type. At block 304, operations are scheduled according to predicted sleep type. At block 306, the operating are conducted according to scheduling (before sleep starts). During sleep time and after wake the method 300 will proceed to block 308. At block 308, operation are conducted according to scheduling (during/after sleep).

A system that collects the data and modifies the behavior of the controller's operation accordingly to the conclusion of the predicted sleep type is proposed. When predicting the sleep type due to impending hibernation, operations may be scheduled to be executed may include, but are not limited to: preparing for potential data retention (DR), which is to perform read scrub and other management operations; preparing for intensive read only workload upon wake (e.g., empty single-level cell (SLC) cache, empty DRAM); and indicating full power wake (e.g., making all lanes and channels available for use upon wake).

Figure 4:
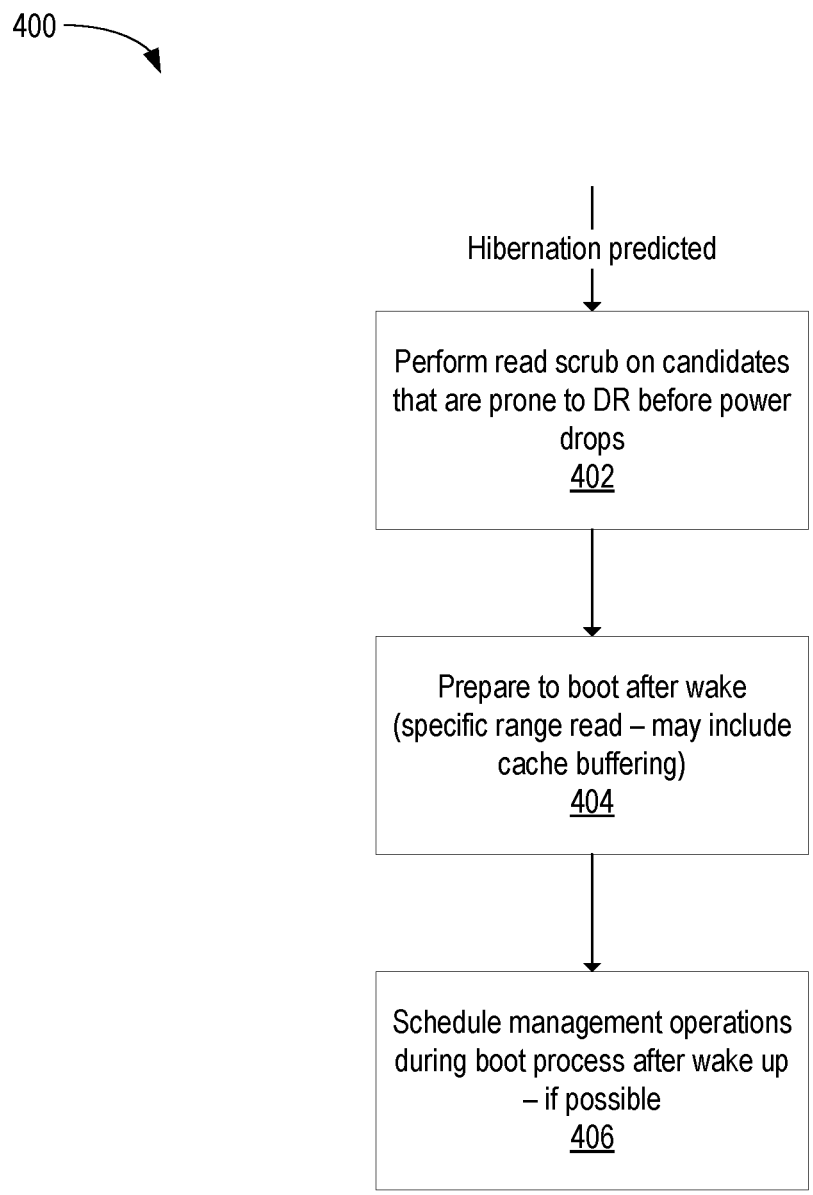
FIG. 4 is a flow chart illustrating a method for predicting hibernation mode wake, according to certain embodiments.

FIG. 4 is a flow chart illustrating a method 400 for predicting hibernation mode wake, according to certain embodiments. The method 400 begins with hibernation predicted and proceeds to block 402. At block 402, the controller such as controller 108 of FIG. 1 performs read scrub on candidates that are prone to DR before power drops. At block 404, the controller prepares to boot after wake (specific range read—may include cache buffering). At block 406, the controller schedules management operations during boot process after wake up (if possible).

On the other hand, when predicting the sleep type is due to Modern Standby, the operation modifications may include short management operations to be conducted during Modern Standby (e.g. searching candidates for random read scrub not operating the read scrub itself, read threshold calibration for certain time tag). The operation modifications may also include assuming restricted power consumption during Modern Standby by, shutting down channels and lanes. The operation modifications may further assume limited to no HMB access during Modern Standby (may affect the available management operations). Additionally, the operation modifications may assume the wake up is within a short period and postpone actual read scrub and don't prepare for DR. Finally, the operation modifications can prepare for past exercised workload upon wake (intensity depends on the activity before modern standby and past experience with the current host). The short method operations are not limited to the operations listed.

Figure 5:
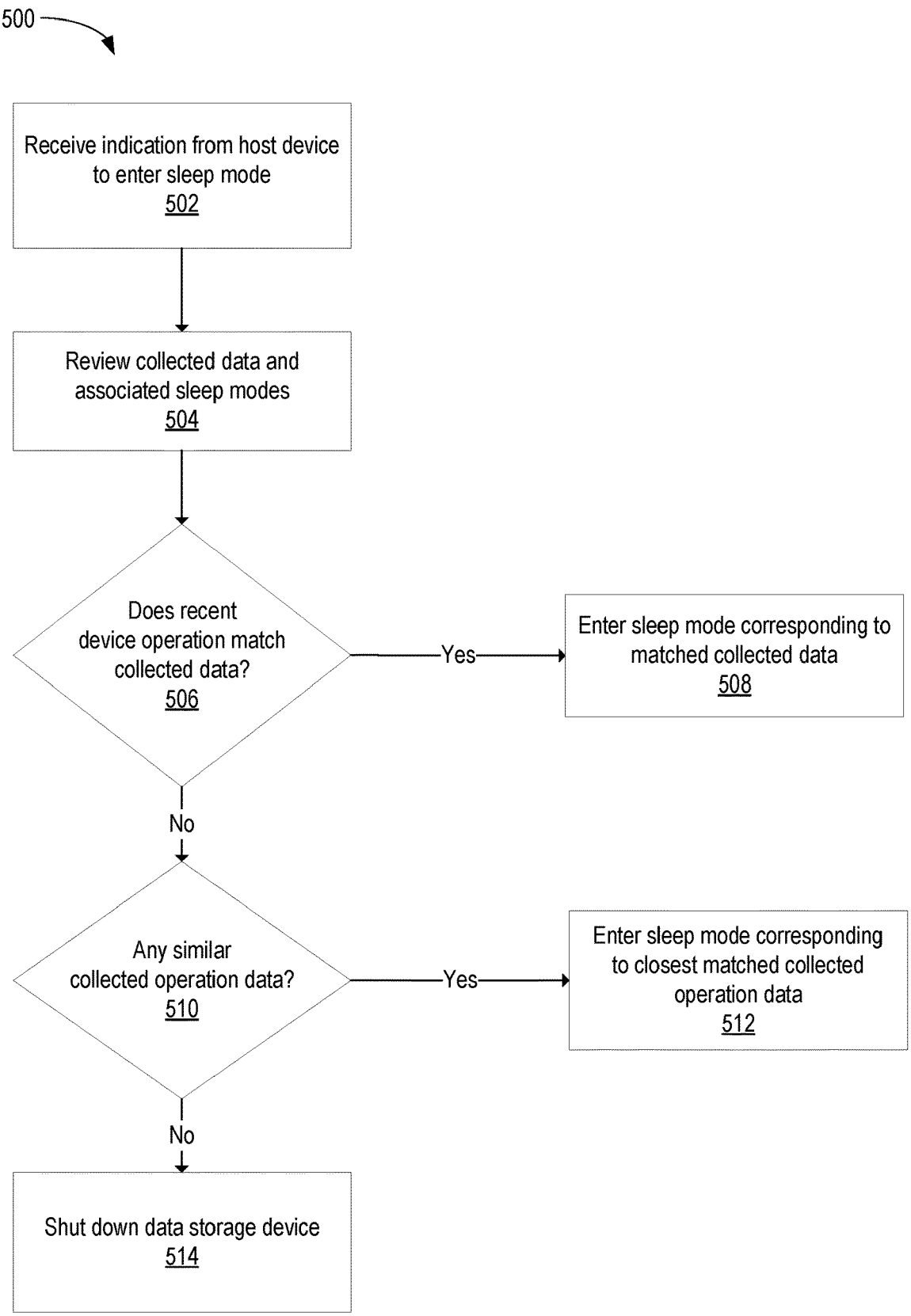
FIG. 5 is a flow chart illustrating a method for sleep type execution, according to certain embodiments.

FIG. 5 is a flow chart illustrating a method 500 for sleep type execution, according to certain embodiments. The method 500 begins at block 502. At block 502, the controller such as controller 108 of FIG. 1 receives indication from the host device to enter sleep mode. At block 504, the controller reviews the collected data and associated sleep modes. At block 506, the controller determines whether the recent device operation matches the collected data. If the controller determines that the recent device operation matches the collected data then method proceeds to block 508. At block 508, the device enters sleep mode corresponding to matched collected data. If the controller determines that the recent device operation does not match the collected data then the method 500 proceeds to block 510. At block 510, the controller determines whether there is any similar collected data. If the controller determines that there is some similar collected data then the method 500 proceeds to block 512. At block 512 the device enters sleep mode corresponding to the closet matched collected operation data. If the controller determines that there is no similar collected operation data then the method 500 proceeds to block 514. At block 514, the data storage device shuts down.

The sleep mode type analysis module may rely on statistical analysis and/or machine learning (ML) techniques to conclude the analysis. As the task is essentially a classification task, which is defined as the problem of identifying which of a set of categories (sub-populations/classes) an observation(s) belongs to, the analysis may use a variety of standard classification algorithms such as, but not limited to, logistic regression, Naïve Bayes, decision trees (as well as random forest and gradient boosting approaches), support vector machine (SVM) or neural network (NN) models.

A classifier is tuned and adapted off-line based on a collection of large data set of operation traces which are aligned with tagging of the different sleep modes. A set of pre-defined features will be extracted from the collected traces and at each point of time (or "data sample") will be allocated to the resulting sleep mode (either one of several sleep modes or coming no-sleep mode situation). Once such data set is built the model's training procedure can be applied, and used during the device life time.

Alternatively, the model can be tuned/adapted based on data collected on-line, which can provide better adaptability of the model to each device behavior and typical use-cases and traces of each specific user. Among the relevant features that were mentioned above, other relevant features are possible, but such features are not limited to: averaged/standard deviation (STD) of command's size, averaged/STD of time between commands, portion of read/program/erase/flush of commands, statistics of commands size/length/timing in different times windows/number of commands back, statistics of power consumptions, statistics of idle times, and statistics or queues-depth. It is to be understood that other relevant features may be considered as well.

Improved sleep communication will reduce power consumption, improve responsiveness, quality of service (QoS), and performance in some common scenarios involving low power mode.

In one embodiment, a data storage device comprises: a memory device; and a controller coupled to the memory device, wherein the controller is configured to: receive an indication to enter sleep mode from a host device; predict a classification of sleep mode; conduct operations based upon scheduling prior to entering sleep mode; enter sleep mode; exit sleep mode; and conduct operations based upon scheduling after exiting sleep mode. The predicting is based upon a workflow of the host device prior to the receiving. The predicting is based upon behavior of the host device prior to the receiving. The predicting is based upon a logical block address (LBA) range accessed by the host device prior to the receiving. The predicting is based upon a time or day of the receiving. The controller is configured to collect data of the host device's behavior. The controller modifies performance of the controller based upon the collected data. Operations conducted prior to entering sleep mode comprise performing a read scrub. The read scrub is performed on data predicted to be used for data retention (DR). Operations conducted prior to entering sleep mode comprise emptying a single level cell (SLC) cache. Operations conducted prior to entering sleep mode comprise emptying a dynamic random access memory (DRAM) cache. Operations conducted after exiting sleep mode comprise opening all lanes and channels between the host device and the controller. The controller is further configured to prepare for a boot operation prior to entering sleep mode. The preparing comprises setting a specific range of data to be read and cache buffering.

In another embodiment, a data storage device comprises: a memory device; and a controller coupled to the memory device, wherein the controller includes a sleep mode analysis module and wherein the controller is configured to: collect data of data storage device operations corresponding to different sleep modes; and predict a sleep mode based upon a received indication to enter sleep mode and the collected data. The controller is pre-loaded with data of data storage device operations corresponding to different sleep modes. The collecting comprises collecting average or standard deviation of a command size, average or standard deviation of time between commands, statistics of command size/length/timing in different times, statistics of power consumption, statistics of idle times, statistics of queue depths, proportions of read/write/erase/flush commands, and combinations thereof.

In another embodiment, a data storage device comprises: means to store data; and a controller coupled to the means to store data, wherein the controller is configured to: receive indications to enter sleep mode from a host device; predict which sleep mode to enter based upon collected data or data storage device operations; and adjust predictive metrics based upon the collected data over time. The controller is further configured to predict a wake up time when the sleep mode is modern standby. The controller is configured to postpone read scrub and data retention (DR) operations based upon the predicted wake up time.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive an indication to enter sleep mode from a host device;
predict a classification of sleep mode;
conduct operations based upon scheduling prior to entering sleep mode;
enter sleep mode;
exit sleep mode; and
conduct operations based upon scheduling after exiting sleep mode.

2. The data storage device of claim 1, wherein the predicting is based upon a workflow of the host device prior to the receiving.

3. The data storage device of claim 1, wherein the predicting is based upon behavior of the host device prior to the receiving.

4. The data storage device of claim 1, wherein the predicting is based upon a logical block address (LBA) range accessed by the host device prior to the receiving.

5. The data storage device of claim 1, wherein the predicting is based upon a time or day of the receiving.

6. The data storage device of claim 1, wherein the controller is configured to collect data of the host device's behavior.

7. The data storage device of claim 6, wherein the controller modifies performance of the controller based upon the collected data.

8. The data storage device of claim 1, operations conducted prior to entering sleep mode comprise performing a read scrub.

9. The data storage device of claim 8, wherein the read scrub is performed on data predicted to be used for data retention (DR).

10. The data storage device of claim 1, operations conducted prior to entering sleep mode comprise emptying a single level cell (SLC) cache.

11. The data storage device of claim 1, operations conducted prior to entering sleep mode comprise emptying a dynamic random access memory (DRAM) cache.

12. The data storage device of claim 1, operations conducted after exiting sleep mode comprise opening all lanes and channels between the host device and the controller.

13. The data storage device of claim 1, wherein the controller is further configured to prepare for a boot operation prior to entering sleep mode.

14. The data storage device of claim 13, wherein the preparing comprises setting a specific range of data to be read and cache buffering.

15. A data storage device, comprising:
a memory device; and
a controller coupled to the memory device, wherein the controller includes a sleep mode analysis module and wherein the controller is configured to:
collect data of data storage device operations corresponding to different sleep modes; and
predict a sleep mode based upon a received indication to enter sleep mode and the collected data.

16. The data storage device of claim 15, wherein the controller is pre-loaded with data of data storage device operations corresponding to different sleep modes.

17. The data storage device of claim 15, wherein the collecting comprises collecting average or standard deviation of a command size, average or standard deviation of time between commands, statistics of command size/length/timing in different times, statistics of power consumption, statistics of idle times, statistics of queue depths, proportions of read/write/erase/flush commands, and combinations thereof.

18. A data storage device, comprising:
means to store data; and
a controller coupled to the means to store data, wherein the controller is configured to:
receive indications to enter sleep mode from a host device;
predict which sleep mode to enter based upon collected data or data storage device operations; and
adjust predictive metrics based upon the collected data over time.

19. The data storage device of claim 18, wherein the controller is further configured to predict a wake up time when the sleep mode is modern standby.

20. The data storage device of claim 19, wherein the controller is configured to postpone read scrub and data retention (DR) operations based upon the predicted wake up time.

* * * * *